United States Patent Office 3,536,647
Patented Oct. 27, 1970

3,536,647
MICROCRYSTALLINE POLYAMIDES AND
DISPERSIONS THEREOF
Orlando A. Battista, Yardley, Pa., assignor to FMC Corporation, Philadelphia, Pa., a corporation of Delaware
No Drawing. Continuation-in-part of application Ser. No. 517,124, Dec. 28, 1965, which is a continuation-in-part of application Ser. No. 236,148, Nov. 7, 1962. This application Jan. 11, 1967, Ser. No. 608,508
The portion of the term of the patent subsequent to Jan. 17, 1984, has been disclaimed
Int. Cl. C08g 20/38, 51/24
U.S. Cl. 260—29.2
8 Claims

ABSTRACT OF THE DISCLOSURE

Microcrystalline synthetic polyamides are mechanically disintegrated, preferably in a liquid swelling media, until at least 10% by weight, does not exceed 1 micron. The resulting stable, colloidal dispersions or gels are useful in coating compositions and, when present in sufficient amounts, may impart thixotropic properties thereto. Gels and recovered, dried disintegrated material may be used in the preparation of molding compositions.

This application is a continuation-in-part of application Ser. No. 517,124, filed Dec. 28, 1965, now U.S. Pat. No. 3,299,011, dated Jan. 17, 1967, which application is a continuation-in-part of application Ser. No. 236,148, filed Nov. 7, 1962, now abandoned.

The invention relates to finely-divided, microcrystalline, synthetic, linear polyamides derived from synthetic, linear polyamides having molecular weights or degrees of polymerization sufficiently high so that the polyamide is capable of forming a self-supporting filament or fiber, the microcrystalline polyamide products being further characterized in their ability to form stable, colloidal dispersions in liquid media having a minimal swelling action which may solvate the surfaces of the individual microcrystals without destroying the crystallinity or laterial order in the interior of the microcrystals.

It is known that synthetic, linear polyamides have a crystalline-amorphous network or morphological structure consisting or regions of high order commonly referred to as crystalline and of regions of low order commonly referred to as amorphous. In this network structure, primary chains extend through a series of microcrystals connecting them by amorphous regions or hinges involving primary molecular bonds. Because of the strength of the primary molecular bonds, it is impractical to free the microcrystals by mechanical means such as attrition and grinding. Dissolving of the polyamide and precipitation results merely in a rearrangement of the crystalline-amorphous network structure leading once again to a continuous network of crystalline and amorphous areas connected by primary molecular bonds.

It is also known that synthetic, linear polyamides having molecular weights sufficiently high to allow conversion into fibers possess toughness and elastic characteristics which make grinding of the polyamides into finely-divided particles very difficult. Precipitation of such polyamides from a solution tends to produce a stringy, cohesive precipitate. Lower molecular weight polyamides may have the necessary physical characteristics to allow the resin to be ground to a finely-divided state and to be precipitated in a finely-divided state. Regardless of the molecular weight of these forms of finely-divided polyamides and whether produced by a grinding operation or by a dissolving and precipitation procedure, the particles are characterized by the typical polyamide crystalline-amorphous network structure. These finely-divided particles do not form stable, colloidal dispersions and gels in liquid swelling media, as defined herein. These particles may be dispersed in such liquid swelling media by agitation, however, when the agitation is discontinued, the particles readily settle out.

The principal purpose of this invention is to provide finely-divided, microcrystalline, synthetic, linear polyamides capable of forming stable, colloidal dispersions and gels in liquid swelling media, as defined herein. A further purpose of the invention is to provide stable, colloidal dispersions and gels of microcrystalline, synthetic, linear polyamides in liquid swelling media, as defined herein.

In accordance with the invention, microcrystalline, synthetic, linear polyamides having a very high degree of crystallinity are subjected to mechanical attrition in the presence of a liquid swelling media, as defined herein, so as to reduce the polyamide to disintegrated microcrystals at least about 10%, by weight, having a particle size not exceeding 1 micron and preferably at least about 90%, by weight, having a particle size not exceeding 1 micron and at least about 10%, by weight, having a particle size not exceeding 0.1 micron. Some of the disintegrated microcrystals in the disintegrated mass will have a size under 0.01 micron. Microstalline polyamides of such crystallinity and high degree of perfection are characterized by a sharp X-ray diffraction pattern as contrasted to the relatively diffuse pattern exhibited by the precursor, fiber-forming polyamides having a crystalline-amorphous network structure.

The filament-forming, synthetic, linear polyamides which are useful for this invention are those described in U.S. Pats. 2,071,250, 2,071,253, 2,130,523, and 2,130,948. These polyamides are of two types, namely, those prepared by the polymerization of monoaminomonocarboxylic acid and those obtainable from diamines and dibasic carboxylic acids. Other polyamides, such as, for example, the caprolactams, which have the crystalline-amorphous structure are also satisfactory.

The fiber-forming synthetic, linear polyamides, preferably in fibrous form, is converted to microcrystalline form by treatment with a dilute aqueous mineral acid solution at a temperature of at least 50° C. but below the melting point of the polyamide without substantial dissolution thereof. The acid treatment must not be so drastic as to excessively swell the crystalline portion of the polyamide or to destroy the microcrystals in the original morphological network structure but must be sufficient so as to selectively attack the interconnecting molecular chains constituting the amorphous hinges. In the selective attack on the amorphous portions, some of the amorphous material is dissolved and some of the molecular chains in the hinges are cut or weakened sufficiently so that upon mechanical disintegration, microcrystals are freed from the aggregated microcrystals.

Acids that are satisfactory to effect the selective treatment of the polyamides are, for example, hydrochloric acid, sulfuric acid and nitric acid.

The preferred mineral acid is hydrochloric acid diluted with water to a concentration of less than 15%. Hydrochloric acid concentrations as low as 2 or 3% are useful but require much longer treatment periods and/or greater mechanical attritions of the partially degraded polymer. Preferably, dilute hydrochloric acid concentrations of from about 5 to about 10% are used to obtain the most desirable results. Higher concentrations than those prescribed greatly reduce the yield of gel-forming product.

The length of time which the linear polyamide is subjected to the dilute acid treatment will vary according to the concentration of the acid and, to some degree, on the particular resinous polyamide employed. However, in general, from ½ to about 6 hours will produce satisfactory yields, the shorter periods being used with higher acid concentrations. For example, treatment of filament-forming linear polyamide with a 5% dilute aqueous hydrochloric acid solution at boiling for 2½ hours will yield a satisfactory product with an 89% yield, while a 10% dilute aqueous hydrochloric acid solution at boiling for one hour provides a product yield of 80%.

Other dilute aqueous mineral acid solutions are useful in concentrations which will not dissolve or swell the microcrystals in the polymer structure but will selectively attack the amorphous areas thereof whereby a gel-forming product is produced by mechanical shear. Dilute aqueous mineral acids which will degrade filament-forming linear polyamide to at least about a degree of degradation equivalent to that obtained by treatment thereof with about 5% aqueous hydrochloric acid solution at a temperature of at least 50° C. for one-half hour, are satisfactory.

The dilute acid treatment is conducted at a temperature of at least 50° C. and preferably at the boiling point of the aqueous acid solution.

Aqueous and/or organic-solvent solutions of organic acids can be used, if desired, to effect the unhinging of the molecular chains in the amorphous regions to make the aggregated microcrystals available for mechanical separation of individual microcrystals. For example, aqueous formic acid solutions of at least 50% concentration with suitable temperature and time conditions are satisfactory. Similarly, an ethanol solution of peracetic acids containing about 5% of the acid is also satisfactory.

For the purpose of preparing stable dispersions or gels of the microcrystalline polyamide material, it may be treated with a swelling agent prior to attrition or they may first be attrited and then dispersed with mechanical agitation in a liquid swelling medium.

Swelling agents for the purposes of this invention are termed "liquid swelling media" and are liquid media that have a minimal swelling action toward the microcrystals and may solvate or tend to solvate the surfaces of the individual microcrystals but do not attack and destroy the lateral order or crystallinity in the interior of the microcrystals. Although the polyamides are relatively insensitive to water, the microcrystalline polyamide products of this invention, particularly those having essentially all material below 1 micron in size and containing the particles below 0.01 micron in size are dispersible in water to form stable dispersions and gels. Water is, therefore, deemed a liquid swelling media for the purposes of the invention. Other satisfactory agents include, for example, dilute aqueous solutions of lower aliphatic acids including formic, acetic, dichloroacetic and trichloroacetic acids, lower aliphatic alcohols including methanol, ethanol and isopropanol, mixtures of phenol, cresol, and resorcinol with water, ketones such as acetone, aldehydes such as formaldehyde, acetaldehyde and other organic solvents such as formamide, dimethylformamide, etc.

Mechanical disintegration of the microcrystalline polyamide may be carried out in several ways, as by subjecting it to attrition or shearing action of conventional, electrically driven kitchen mixers, planetary mixers, sonic mixers, or other attrition mills, or to high speed cutting action, or to the action of high pressures. The disintegration of the microcrystalline polyamide material is advantageously carried out in the presence of a liquid medium, although where high pressure alone is employed, such medium, while desirable, is not necessary. Aqueous formic acid solution is a preferred medium, but other liquids are suitable, including water, sugar solutions, polyols, of which glycerol is an example, alcohols, particularly ethanol, isopropanol, and the like. Whatever method is used, the disintegration is carried out to such an extent that the resulting particulate material is characterized by forming a stable suspension in the liquid swelling medium in which they are being attrited, or in which they are subsequently dispersed. The amount of disintegration must be sufficient to at least 10%, by weight, has a particle size not exceeding 1 micron, and preferably until at least 90%, by weight, has a particle size not greater than 1 micron and at least about 10%, by weight, has a particle size not greater than 0.1 micron. By a stable suspension is meant one from which the attrited material will not settle out but will remain suspended indefinitely, even for periods measured in terms of weeks or months. At lower concentrations of the attrited material, the suspension is a dispersion, while at higher concentrations, it is a gel.

Following the mechanical disintegration of the hydrolyzed material, the resulting product, whether a dispersion or gel, may be used as such; or it may be dried; or it may be desirable to separate it into fractions having a more uniform particle size distribution. The dried attrited material is readily redispersed in a liquid swelling medium with the help of a blender-type agitator.

For producing the dried products, a number of drying procedures are available, and while redispersible materials result from each procedure, some procedures are more advantageous than others. Examples of drying procedures include freeze-drying, spray drying, drum drying, drying by solvent displacement, and oven-drying.

Fractionation of the attrited products may be accomplished by means of such separation procedures as mechanical sifting, settling in water, or centrifuging. Cyclone-type separators are very useful for the dried product.

Shaped articles may be formed from the stable dispersions of this invention by forming, for example, by extruding or casting the dispersion in the desired shape, and then washing or immersing the article in water or a dilute alkaline solution including, for example, sodium hydroxide. Or, the microcrystalline polyamide gel or dried attrited material may be blended with an appropriate plasticizing agent and the blends extruded, molded or cast into various shapes, and dried. The dispersions and gels are also useful in the production of films, as coatings for various base materials such as, for example, paper, wood, etc. and as a binding agent in non-woven fabrics. The microcrystalline, linear polyamide of this invention is also useful for admixture with microcrystalline cellulose in the production of molding powders The following examples are set forth to illustrate the production of the finely-divided, microcrystalline polyamides and some of the uses thereof

EXAMPLE 1

150 grams of polyhexamethylene adipamide staples fiber was hydrolyzed for 8 hours at 72° C. in 1150 cc. of 5% aqueous hydrochloric acid solution. After washing the hydrolyzed polyamide with water until most of the acid was removed, it was briefly (20 minutes) attrited in a Hobart mixer and then for 7 minutes in a "Mixmaster" in water at a 35% solids concentration to reduce the product to a fibrous pasty mass 400 cc. of a 90% aqueous formic acid solution was added to this fibrous mass which was mixed and allowed to stand overnight at room temperature. The acid mixture was neutralized to pH 7 with sodium hydroxide and the entire suspension dialyzed overnight After filtration, the product retained a great deal of water and additional water was added to obtain a 10% solids concentration. The mixture was attrited for 20 minutes in a "Mixmaster" to obtain a smooth stable gel.

A fine film was made from a gel containing 32% of the microcrystalline polyamide in concentrated formic acid and casting a sheet thereof in water or dilute alkali A portion of the attrited material was recovered from the gel by solvent extraction using acetone and finally volatilizing the acetone sample of the untreated or virgin polyamide fiber and a sample of the dried, attrited product of this example were then heated individually in a Perkin-Elmer Recording Differential Scanning Calorimeter calibrated to 0.1°. The virgin fiber exhibited a melting range of 245° C. to 268° C. with a peak at 259° C. in the melting curve. The product of this example exhibited two separate melting ranges, one in a range of 243° C.

to 250° C. with a peak at 247° C. and the second in a range of 252° C. to 264° C. with a peak at 260° C.

EXAMPLE II

Two grams of nylon fibers (paper grade) were dissolved in 50 grams of concentrated hydrochloric acid stirred for 45 minutes, then precipitated in an excess of water, and acetone dried On examination, the X-ray diffraction pattern indicated the material to be much more amorphous than the gel-forming material prepared in accordance with this invention. The destruction of the crystalline-amorphous morphology and regeneration of a new crystalline-amorphous network in the linear polyamide is contrary to the aims of the process of this invention which is to retain and improve the crystalline nature of the linear polyamide and thus to obtain a material capable of gel-forming when subjected to mechanical attrition The acetone-dried, precipitate was swollen in 45% solution of formic acid in water overnight and then water washed. The material was attrited in a Waring Blendor for 30 minutes at a solids content of 1.5%. A fibrous product, which immediately settled into two phases resulted The fibrous portion of the product was separated from the fines and the two materials were recovered by solvent extraction using acetone. The fibrous portion of the product exhibited a melting range of 252° C. to 268° C. with a broad maximum between 260° C. and 263° C. A sample of the fibrous portion after ball-milling for 3 hours exhiibed a melting range of 251° C. to 268° C. with a broad maximum between 259° C. and 263° C.

The fines exhibited a melting range of 257° C. to 268° C. with a peak at 263° C. A sample of the fines after ball-milling 3 hours exhibited a melting range of 253° C. to 267° C. with a broad maximum between 259° C. and 263° C.

EXAMPLE III 3 grams of nylon fibers (paper grade) were treated with a 5% aqueous solution of hydrochloric acid at reflux (102° C.) for two and one-half hours. The product was filtered, water washed and dried with acetone. The dried product was swollen in 45% formic acid overnight and then water washed. The product was mixed with water to a one and one-half percent solids content and attrited for 30 minutes in a Waring Blendor. A gel-like product at a yield of 89% was obtained. The product retained a very high degree of lateral order or crystallinity.

A 20% gel of the product in water was spread on an uncoated, bleached sulfite paper by means of a doctor blade to provide a layer about 0.0005 inch in thickness. The coated paper was then dried and calendered between heated rolls to form a smooth, glossy surfaced coated paper.

EXAMPLE IV 3 grams of nylon fibers (paper grade) were treated with a 2.5 N (at 9%) solution of hydrochloric acid at reflux (102° C.) for one hour. The product was further treated as described in Example III to obtain a gel-like product at a yield of 80%. With this more severe hydrolysis treatment, the product lost some of its lateral order as shown in an X-ray diffraction diagram, but, nevertheless, still showed a distinct retention of its original morphology.

The disintegrated mircocrystalline polyamide products are also useful in paint compositions where they aid in stabilizing the dispersions of pigments, acrylic latex, etc. and, also, may impart thixotropic properties. The products are particularly advantageous in the modern water based acrylic emulsion type coating compositions. These coating compositions generally comprise water, and acrylic latex or film-foaming substance, pigments or coloring materials, thickening agents and various types of surfactants. One of the thickening agents commonly used is a naturally occurring magnesium aluminum silicate such as marketed under the trademark "Veegum." The microcrystalline polyamide products of the present invention are highly satisfactory as a replacement for the magnesium aluminum silicate and aids in stabilizing the emulsions and the dispersions of the pigments. Such use of the products is illustrated in the following example wherein the indicated parts are parts by weight.

EXAMPLE V

A representative water based polyvinyl acetate emulsion type product was formed for four different mixtures.

Mixture A consisted of water, a sodium salt of a carboxylated polyelectrolyte commonly used as a dispersing material for pigments and marketed under the trademark "Tamol 731", a non-ionic, low-foaming surfactant marketed by Rohm & Haas Company as CF-10, an antifoaming agent commonly termed a latex deaerator marketed under the trademark "Nopco NDW" and hydroxyethyl cellulose marketed under the trademark "Natrosol." These ingredients were thoroughly mixed to form Mixture A having the following composition:

Mixture A

| | Pts. |
|---|---|
| Water | 90.0 |
| Tamol 731 | 8.0 |
| CF-10 | 1.6 |
| Nopco NDW | 1.6 |
| 2% soln. Natrosol | 40.0 |

A second mixture was prepared consisting of water, ethylene glycol, diethylene glycol and a mildewcide marketed under the trademark "Metasol 57." The mixture had a composition as follows:

Mixture B

| | Pts. |
|---|---|
| Water | 12.0 |
| Ethylene glycol | 17.6 |
| Diethylene glycol | 8.0 |
| Metasol 57 | 0.5 |

A pigment mixture was made consisting of titanium dioxide, calcium carbonate, sodium aluminosilicate marketed under the trademark "Zeolex 80" and a silicate talc marketed under the trademark "Icecap K." The composition of the pigment mixture was as follows:

Mixture C

| | Pts. |
|---|---|
| Titanium dioxide | 160 |
| Calcium carbonate | 43 |
| Icecap K | 104 |
| Zeolex 80 | 22 |

A fourth mixture which may be termed the film-forming mixture was prepared from a Rohm & Haas Company acrylic emulsion "AC-22" (polyvinyl acetate latex emulsion, 44% solids), the latex deaerator ("Nopco NDW"), hydroxyethyl cellulose and a water dispersion of the polyamide product of Example I (4% solids). The composition of this mixture was as follows:

Mixture D

| | Pts. |
|---|---|
| AC-22 | 167 |
| Nopco NDW | 3.2 |
| 2% soln. Natrosol | 158 |
| Microcrystalline poylamide (4% dispersion) | 64 |

Mixtures A and B were each prepared separately by high speed mixing operations and the two mixtures combined using a high speed mixing procedure. The pigment mixture, namely, Mixture C, was then mixed with the combined Mixtures A and B using a slow mixing procedure. After a thorough mixture had been prepared, the film-forming mixture, namely, Mixture D was then added and thoroughly mixed to form the final paint mixture. The paint contained approximately 41% total solids and contained approximately 81.5 parts of pigment to 18.5 parts of binder or film-forming material. The microcrystalline polyamide permits a reduction in the titanium dioxide content and an increase in the calcium carbonate content without noticeably affecting the covering power or brilliance of the paint. The presence of the microcrystalline polyamide also contributes to the latex particle stability of the system. Obviously, any desired coloring material may be added to provide a desired tint or color to the finished paint.

The polyamide products are also useful as gellants and carriers for coloring materials in inks. The products add to the stability of the inks and can be used to impart thixotropic properties. They may replace various gums and resin-like materials conventionally employed in various inks.

In the following example of a fluorescent-type ink, the polyamide product of Example I replaces the conventionally used gum arabic and imparts thixotropic properties to the ink.

Example VI

|  | Pts. |
|---|---|
| Fluorescent dye | 0.5 |
| Ethylene glycol | 20.0 |
| Ethylene glycol monomethyl ether | 20.0 |
| Microcrystalline polyamide | 15.0 |
| Water to make 100.0. | |

The polyamide products are also useful in coating compositions and inks which are substantially water free and comprise various types of film-forming materials and organic solvents or oragnic liquids in certain types of inks used in the production of magazines. A varnish-like base is utilized and contains film-forming materials such as, for example, drying oils. This base is commonly termed Publication Varnish and consists essentially of

|  | Pts. |
|---|---|
| Ester gum | 100 |
| Rosin oil | 10 |
| Bodied linseed oil | 40 |
| Straw paraffin | 200 |
| Lead and manganese acetates | 10 |
| Cobalt acetate | 10 |

To this base is added the desired coloring material and the microcrystalline polyamide may be added as a thickening material or sufficient amounts may be included to form a thixotropic composition.

The following example illustrates one such ink.

EXAMPLE VII

|  | Pts. |
|---|---|
| Publication Varnish | 500 |
| Milori Blue in rosin oil | 20 |
| Microcrystalline polyamide | 4 |

The terms "filament-forming" and "fiber-forming" as applied to the precursor synthetic polyamides are used herein to denote synthetic linear polyamides having molecular weights or degrees of polymerization sufficiently high so that a filament or fiber can be produced by touching a sample of the molten polymer with a rod and drawing the rod away.

Various changes and modifications may be made practicing the invention without departing from the spirit and scope thereof and, therefore, the invention is not to be limited except as defined in the appended claims.

I claim:

1. An article of manufacture comprising a finely-divided, mechanically disintegrated, microcrystalline, synethetic, linear polyamide at least 10%, by weight, having a particle size not exceeding 1 micron, the mechanically disintegrated polyamide being further characterized in forming a stable, colloidal dispersion in liquid media having a minimal swelling action on the microcrystals which may solvate the surfaces without destroying the interior of the microcrystals and, in contrast to the precursor synthetic, linear polyamide, exhibiting a sharp X-ray diffraction pattern and two separate melting point ranges, and in having been formed by treating a precursor synthetic, linear polyamide with a dilute aqueous solution of a mineral acid at a temperature of at least 50° C. without substantial dissolution thereof to provide a polyamide material having a higher crystallinity than the precursor polyamide, treating the higher crystallinity polyamide with a liquid swelling agent and mechanically attriting the higher crystallinity polyamide.

2. An article of manufacture as defined in claim 1 wherein the mechanically disintegrated polyamide has a particle size such that at least about 90%, by weight, does not exceed 1 micron and at least about 10%, by weight, does not exceed 0.1 micron.

3. An article of manufacture as defined in claim 1 which is in the form of a dispersion of the mechanically disintegrated polyamide in a liquid media having a minimal swelling action on the microcrystals which may solvate the surfaces without destroying the interior of the microcrystals.

4. An article of manufacture as defined in claim 1 which is in the form of a dispersion of the mechanically disintegrated polyamide in an aqueous liquid media having a minimal swelling action on the microcrystals which may solvate the surfaces without destroying the interior of the microcrystals.

5. An article of manufacture as defined in claim 1 which is in the form of a dispersion of the mechanically disintegrated polyamide in water.

6. An article of manufacture as defined in claim 1 which is in the form of a dispersion of the mechanically disintegrated polyamide in an organic liquid media having a minimal swelling action on the microcrystals which may solvate the surfaces without destroying the interior of the microcrystals.

7. An article of manufacture as defined in claim 3 which includes a coloring material.

8. An article of manufacture as defined in claim 7 which includes a film-forming material.

References Cited

UNITED STATES PATENTS

| 2,265,127 | 12/1941 | Bolton | 260—78 |
| 3,299,011 | 1/1967 | Battista | 260—29.2 |
| 3,355,409 | 11/1967 | Bissot | 260—29.2 |
| 3,368,992 | 2/1968 | Altermatt | 260—29.2 |

JOHN C. BLEUTGE, Primary Examiner

U.S. Cl. X.R.

117—148, 155, 161; 260—18, 24, 28, 29.6, 30.8, 32.4, 32.6, 32.8, 33.4, 37, 78, 857

UNITED STATES PATENT OFFICE
CERTIFICATE OF CORRECTION

Patent No. 3,536,647      Dated October 27, 1970

Inventor(s) Orlando A. Battista

It is certified that error appears in the above-identified patent and that said Letters Patent are hereby corrected as shown below:

Col. 1, line 40, "laterial" should read --lateral--

Col. 2, line 24, "Microstalline" should read --Microcrystalline--. Col. 4, line 41, insert a period (.) after "powders"; line 44, insert a period (.) after "thereof"; line 45, "l" should read --I --; line 46, "staples" should read --staple--; line 54, insert a period (.) after "mass"; line 59, insert a period (.) after "night"; line 65, insert a period (.) after "alkali"; line 68, insert a period (.) after "acetone" and also insert -- A --. Col. 5, line 7, insert a period (.) after "dried"; line 18, insert a period (.) after "attrition"; line 24, insert a period (.) after "resulted"; line 31, "exhiibed" should read --exhibited--. Col. 6, line 12, "for" should read --from--; Col. 7, line 30, move "to make 100.0" to the right-hand side of the column and "to" should read -- To --; line 34, "oragnic" should read --organic--. Col. 8, line 6, "ethetic" should read --thetic--.

SIGNED AND SEALED
FEB 9 1971

(SEAL)
Attest:

Edward M. Fletcher, Jr
Attesting Officer

WILLIAM E. SCHUYLER, JR.
Commissioner of Patents